United States Patent [19]

Whiteman

[11] 4,378,756

[45] Apr. 5, 1983

[54] ANIMAL BEDDING, PROCESS AND APPARATUS FOR PREPARING THE SAME

[75] Inventor: Patrick W. Whiteman, Reston, Va.

[73] Assignee: Recycled Paper Bedding, Inc., Reston, Va.

[21] Appl. No.: 291,482

[22] Filed: Aug. 10, 1981

Related U.S. Application Data

[63] Continuation of Ser. No. 74,238, Sep. 10, 1979, abandoned.

[51] Int. Cl.³ .................................................. A01K 1/015
[52] U.S. Cl. ........................................................ 119/1
[58] Field of Search .......................................... 119/1

[56] References Cited

U.S. PATENT DOCUMENTS

| | | | |
|---|---|---|---|
| 2,708,418 | 5/1955 | Sugarman et al. | 119/1 |
| 3,358,647 | 12/1967 | Wilson | 119/1 |
| 3,828,731 | 8/1974 | White | 119/1 |

*Primary Examiner*—Hugh R. Chamblee

[57] ABSTRACT

This invention is directed to a new and improved animal bedding comprising newsprint subdivided into a range of particle sizes. The bedding provides the necessary liquid absorbence and resistance to compaction without excessive dust. The invention is directed also to the process and hammermill apparatus for preparing said bedding.

2 Claims, 3 Drawing Figures

ANIMAL BEDDING, PROCESS AND APPARATUS FOR PREPARING THE SAME

This is a continuation, of application Ser. No. 74,238, filed Sept. 10, 1979, now abandoned.

This invention relates to a new and improved animal bedding prepared from cellulosic material such as newsprint. It also relates to the process and apparatus for preparing the new bedding.

Animal bedding, particularly for large animals such as horses, should be highly absorbent and be able to withstand considerable compaction. However, it should not contain an excessive amount of finely divided particles which cause a dust problem.

It is an objective of the present invention to prepare an animal bedding from newsprint, a cellulosic material in abundant supply as discarded newspapers. It is a further object of this invention to develop a process and an apparatus for producing an animal bedding from newsprint.

Newsprint has been subdivided into small particles for use as building insulation. Prior art insulation-type materials prepared with shredding or hammermill machinery are not suitable as animal bedding, however, because they tend to compact too much in use and because they contain an excessive amount of fine particles, which causes a problem of dust. Newsprint-insulation material of the prior art has been used as animal bedding, but has been found unsatisfactory because of excessive dust and excessive compaction.

Applicant has found that by important alterations, conventional hammermill machinery can be made to mill newsprint so as to produce a highly satisfactory animal bedding. The product satisfies the absorption and compaction requirements of an animal bedding without producing escessive dust. Also, the product, after use, can be spread on agricultural fields as a mulch.

Figure 1:
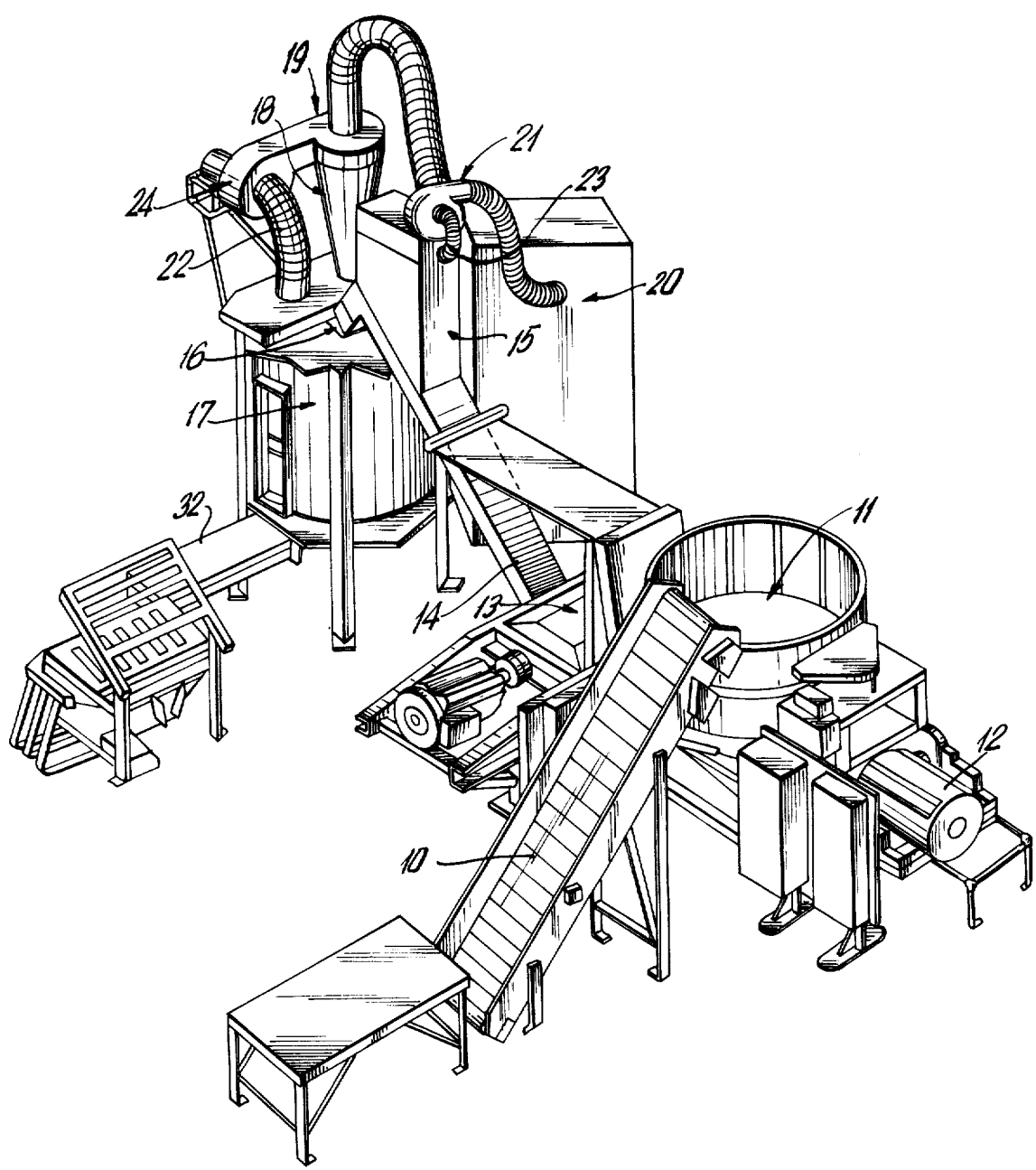

FIG. 1 depicts a commercial hammermill modified in accordance with the present invention. This particular mill is a two stage "Haybuster" model PS hammermill manufactured by Ideal Insulation, Inc. of Jamestown, N. Dak. The first stage of the hammermill is powered by a 150 h.p. (1785 r.p.m.) motor; the second stage, by a 100 h.p. (1775 r.p.m.) motor.

Figure 2A:
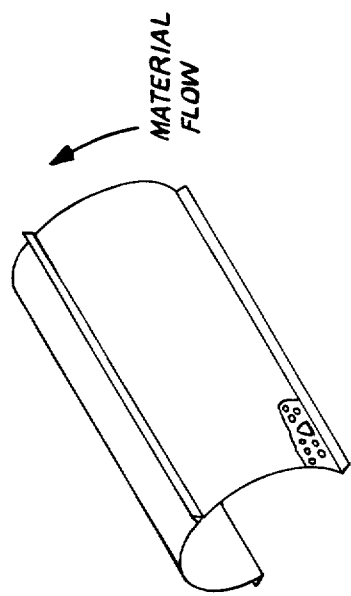

FIG. 2A depicts a hammermill screen for use in a hammermill in accordance with this invention.

Figure 2B:
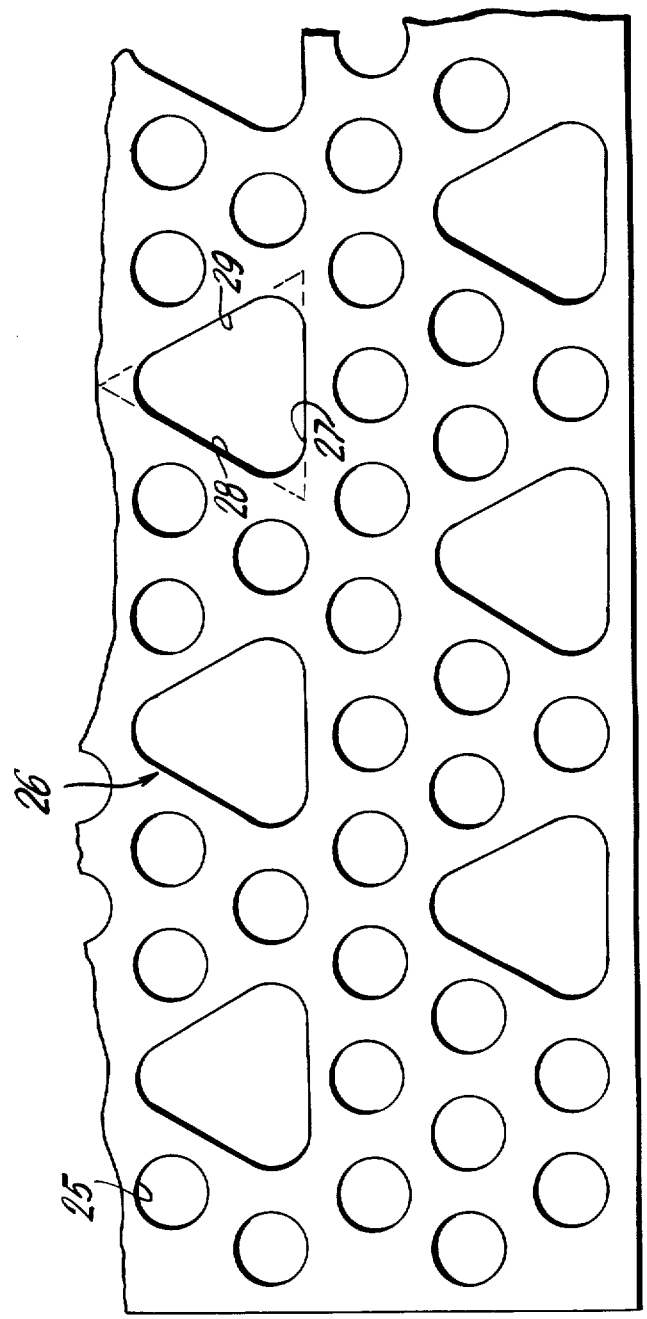

FIG. 2B presents a section of the screen of FIG. 2A, showing the hole pattern of the screen.

To prepare bedding according to this invention, newsprint is fed to the hammermill, FIG. 1, by means of input conveyor 10. Conveyer 10 moves the newsprint to the primary grinder 11 where hammermills grind it against screens shown in FIG. 2A. Blower 12 cools the grinding operation. Ground material exiting primary grinder 11 moves by screw conveyor (not shown) to the secondary grinder 13, where hammermills grind it against screens shown in FIG. 2A. Blower 12 also cools the secondary grinding operation.

Ground material exiting the secondary grinder 13 moves by screw conveyor 14 to the bagger-hopper 17, which is a cylindrical container approximately 4½ feet in diameter and approximately six feet high. Before dropping into the top of hopper 17 the material passes magnet 16, which removes ferrous metal contamination.

Bagger-hopper 17 is fitted with a primary dust removal system comprising a cyclone 18, blowers 19 and 24 and dust trap 20. Cyclone 18 is mounted atop bagger-hopper 17. As ground material drops from screw conveyor 14 into an inlet port in the top of bagger-hopper 17, blower 24 draws dust and some larger particles through line 22, a nine-inch line leading from the top of bagger-hopper 17 (at a point six inches distant from the material inlet port) to cyclone 18. Cyclone 18 separates dust from larger particles, which larger particles drop from cyclone 18 back into bagger-hopper 17. Blower 19 pulls the dust from cyclone 18 and passes it to dust trap 20. Blower 19 is powered by a three h.p. motor; blower 24, by a one h.p. motor.

Mounted on the discharge end of screw conveyer 14 is an enclosed chamber 15, to which is attached a secondary dust removal system comprising blower 21, powered by a 1½ h.p. motor. Blower 21 draws dust from the material in screw conveyer 14 through a three inch line 23 from a point near the top of the chamber 15 and passes it directly to dust trap 20. Line 23 is located approximately four feet above screw conveyer 14.

The finished animal bedding product collects in the bagger-hopper 17. If desired, screw conveyers 32 can be use to load bags, and conventional bag sealing equipment can be used for final bag closure.

FIGS. 2A and 2B depict the screens used in the primary grinder 11 and secondary grinder 13 of the hammermill of FIG. 1. FIG. 2A shows the two curved screens in each grinder. The two screens form a semicircle having a radius of 11.5 inches. FIG. 2B is an enlarged view of a portion of one screen, showing one embodiment of the hole pattern of the screen. The hole pattern comprises a base pattern of staggered rows of circular holes 25 of 0.5 inch diameter spaced on 0.75 inch centers. Superimposed on the base pattern is a pattern of larger holes 26, of approximately triangular shape. The latter holes approximate somewhat rounded equilateral triangles. The triangles, if not rounded, would have sides 27, 28, 29 of approximately 1.5 inches. In the preferred embodiment the number of larger holes 26 is approximately 10% of the number of smaller, circular holes 25. In the preferred embodiment the total area encompassed by smaller holes is roughly two thirds of the total hole area.

In the embodiment shown in FIG. 2B the triangularly shaped holes are pointed downstream; that is, the base 27 of the triangle is upstream to the direction of material flow across the screen. In this embodiment, the cellulosic material is cut against the apex formed by sides 28 and 29 of the triangularly shaped hole 26. By end-to-end reversal of the screen, the triangularly shaped holes 26 can be made to point upstream; that is, to have the base 27 of the triangle downstream to the direction of material flow across the screen. In the latter embodiment, the cellulosic material is cut against the base 27 of the triangularly shaped hole 26.

A hammermill rends cullulosic material such as newsprint into flat particles having irregular major surfaces of a variety of sizes and shapes. The thickness of the flat particles is generally either the thickness of the newsprint or double that thickness, where the particles comprise folded thicknesses of newsprint. Because of their irregular shapes, it is difficult to categorize the particles according to size distribution. The products according to this invention have been observed, however, generally to have major surfaces with maximum diameters no more than about one-to-three times their minimum diameters. In other words, the particles are not accurately characterized as strips. It has therefore been possible to categorize the products according to the approximate maximum diameters of the particles.

EXAMPLE 1

Both the primary grinder and the secondary grinder were equipped with screens shown in FIG. 2B. The screens in the primary grinder were placed with the triangularly shaped holes pointed downstream. The screens in the secondary grinder were also placed with the triangularly shaped holes pointed downstream.

Dust removal was achieved by employing both the primary and the secondary dust removal systems. Dust was removed from the material entering the bagger-hopper at a rate of about eight, 30-pound bags of dust per 1000, 25-pound bags of product.

The grinding rate of the hammermill was maintained at or above 75 pounds of newsprint per minute.

The animal bedding product prepared according to this example was found to have a bulk density of 3.05 pounds/cubic foot. The product was tested in horsestalls. The bedding was judged very satisfactory with respect to dust: no dust problem was observed. The bedding was judged quite acceptable with respect to packing.

EXAMPLE 2

According to a method, known in the art, of preparing building insulation, both the primary and secondary grinders were equipped with screens containing only the base pattern of circular holes shown in FIG. 2B.

Dust removal was performed using only the primary dust removal system attached to the bagger-hopper.

When used in horsestalls, the product was judged not acceptable because of excessive dust and also not acceptable because of a tendency to pack excessively during use.

EXAMPLE 3

The primary grinder was equipped with screens shown in FIG. 2B. The screens were placed with the triangularly shaped holes pointed upstream. The secondary grinder was equipped with screens containing only the base pattern of circular holes shown in FIG. 2B.

Dust removal was performed using only the primary dust removal system.

The product of this example was found to have a bulk density of 2.63 pounds/cubic foot. When used in horsestalls, the product was judged to be an improvement over the product of Example 2 but nonetheless not acceptable because of excessive dust and also not acceptable because of a tendency to pack excessively during use.

EXAMPLE 4

The two-stage hammermill was set up and operated in accordance with Example 1 with one exception: dust removal was performed using only the primary dust removal system.

The dust removal was lower then for Example 1. Whereas the dust removal rate was about eight bags of dust per 1000 bags of product in Example 1, the rate in this example was only about five, 30-pound bags per 1000, 25-pound bags of product, a drop of half in the amount of dust removed.

The animal bedding product prepared according to this example was tested in horsestalls and found to be acceptable as livestock bedding. As compared to the product of Example 1, the product of this example was judged equal with respect to tendency to pack during use but somewhat inferior with respect to the amount of dust observed.

EXAMPLE 5

The two-stage hammermill was set up and operated in accordance with Example 1 with one exception: of the two screens in the secondary grinder the first, or upstream, screen was placed with the triangular holes pointed upstream; the second, or downstream, screen was placed with the triangular holes pointed downstream.

The change in screen placement produced two observable changes. More large particles ($\frac{1}{2}$ to 1 inch diameter) were produced and about twice as much dust was recovered per thousand bags of product.

The animal bedding product prepared according to this example was tested in horsestalls and found to be acceptable as bedding. As compared to the product of Example 1, the product of this example was judged slightly inferior with respect to tendency to pack during use. No dust problem was observed.

The products of this invention, Example 1, 4 and 5, are markedly superior to the unacceptable products of Examples 2 and 3.

To compare the product of this invention with unacceptable products a number of tests were run on the products of Examples 1 and 3. The product of Example 3 was chosen over the prior art product of Example 2, because the product of Example 3 was judged less unacceptable than the product of Example 2. The product of Example 1 is the preferred embodiment of this invention.

A size distribution was run utilizing a loosening and sizing procedure with a forced air atmosphere above a vibrating screen. The results are shown in Table 1 below.

TABLE 1

| Product Size Distribution, weight percent | | |
| --- | --- | --- |
| Product Fraction | Example 1* | Example 3 |
| dust and fines (1/32 inch dia.) | 24.7 | 37.3 wt. % |
| medium size (1/32-$\frac{1}{4}$inch dia.) | 49.4 | 54.0 |
| large size ($\frac{1}{4}$-1 inch dia.) | 25.9 | 8.7 |

*The product of Example 1 was found to contain about 2 wt. % of extraneous fragments of unknown origin. Those fragments are not included in the tabulated distribution.

The results set forth in Table 1 show that the product of this invention has a very different size distribution from the unacceptable product of Example 3 and, therefore, an even more greatly different size distribution from the prior art product of Example 2. The product of Example 3 has about fifty percent more dust and fines than does the product of Example 1, and about 65% less of the large size particles. The product of Example 3 was observed to have very few pieces with a maximum diameter as large as $\frac{3}{4}$-inch, whereas the product of Example 1 had numerous particles with a maximum diameter of approximately one inch.

Compressibility and recovery were tested by placing test samples in a cylinder of 9 cm. diameter and compressing the samples with a seven pound piston for ten minutes. The product of Example 1 was compressed 33.9 vol. percent by the load but recovered considerably more than half of that volume, 22.4%, after three hours following removal of the load. The product of Example 3 was compressed 40.5 vol. percent by the load, and recovered slightly less than half of that volume, 18.2%, when the load was removed. The product of this invention showed both improved resistance to compression and improved recovery compared to the product of Example 3. This correlates with the improved resistance to compaction observed in actual trials in horsestalls.

Liquid absorption was investigated by placing the products on a screen and flooding them with water. Two measurements were made: the maximum amount of water the test sample would hold (water saturation uptake) and the amount of water the test sample would retain when the screen was tapped repeatedly (water absorption). The product of this invention, Example 1, performed surprisingly well considering its much larger average particle size as compared to the product of Example 3. Water absorption was 8.5 wt. % for the product of Example 1 as compared to only 8.7 wt. % for the product of Example 3. The water saturation uptake was 9.7 wt. % for the product of Example 1; 10.6 wt. % for the product of Example 3.

The product of this invention comprises newsprint of a specified size distribution. It is readily apparent, however, that another non-glossy cellulosic material such as cardboard may be substituted for a minor proportion of the newsprint.

To further reduce any tendency to produce dust during use, it is possible to add to the product of this invention a conventional, animal-safe, dust suppressant such as Mazo dust suppressant (80% Mazol GMO and 20% T-Maz-80) marketed by Mazer Chemical, Inc. of Garnee, Ill.

As many embodiments of this invention may be made without departing from the spirit and scope thereof, it is to be understood that this invention is not limited to the specific embodiments particularly described above.

I claim:

1. An animal bedding comprising subdivided newsprint consisting essentially of flat particles with irregularly shaped major surfaces of a maximum diameter not more than about three times the minimum diameter, said maximum diameter being less than about one-inch, said particles having a particle size distribution including at least about 15 wt. percent greater than one-quarter inch maximum diameter, at least about 40 wt. percent greater than 1/32 inch but less than one-quarter inch in maximum diameter and not more than about 30 wt. percent smaller than 1/32 inch in maximum diameter.

2. An animal bedding according to claim 1 wherein said particle size distribution includes about 25 wt. percent greater than one-quarter inch in maximum diameter and about 25 wt. percent smaller than 1/32 inch in maximum diameter.

* * * * *